United States Patent [19]

Ambrose et al.

[11] Patent Number: 5,755,410
[45] Date of Patent: May 26, 1998

[54] SLIDING POINTING DEVICE TRAY

[75] Inventors: Frederic C. Ambrose, Brewster; David Hawley, Sterling, both of Mass.

[73] Assignee: Flex-Rest, LLC, Brewster, Mass.

[21] Appl. No.: 556,593

[22] Filed: Nov. 13, 1995

[51] Int. Cl.⁶ ........................................................ B68G 5/00
[52] U.S. Cl. ........................... 248/118; 248/918; 400/715
[58] Field of Search ............................... 248/118, 118.1, 248/118.3, 118.5, 918, 301; 400/715; 108/102, 143

[56] References Cited

U.S. PATENT DOCUMENTS

| | | |
|---|---|---|
| 652,567 | 6/1900 | Nesse . |
| 942,366 | 12/1909 | Deeter . |
| 4,913,387 | 4/1990 | Tice .......................... 400/717 X |
| 5,009,379 | 4/1991 | Sadler . |
| 5,203,527 | 4/1993 | Rubey ........................ 248/118 |
| 5,316,249 | 5/1994 | Anderson .................... 248/146 |
| 5,346,164 | 9/1994 | Allen ........................ 248/118 |
| 5,358,208 | 10/1994 | Moseley, III et al. ......... 249/918 X |
| 5,413,294 | 5/1995 | Greenquist .................. 248/918 X |
| 5,433,407 | 7/1995 | Rice .......................... 248/118.1 |
| 5,443,237 | 8/1995 | Stadtmauer ................ 248/118.3 X |
| 5,470,040 | 11/1995 | Bhagat et al. ............... 248/918 X |
| 5,490,647 | 2/1996 | Rice .......................... 248/118.1 |
| 5,562,270 | 10/1996 | Montague .................... 248/118.1 |

OTHER PUBLICATIONS

Alimed Catalog, pp. cover sheet, 2–18, Issue 1 (1997).
Alimed Catalog, p. 7 (Undated).

Primary Examiner—Ramon O. Ramirez
Attorney, Agent, or Firm—Testa, Hurwitz & Thibeault, LLP

[57] ABSTRACT

Disclosed is a system for positioning a computer mouse relative to a computer keyboard. The system comprises a keyboard support tray having a front portion, a rear portion, and a support surface which is adapted to support the keyboard. The system further comprises a palm rest connected to the front portion of the keyboard support tray. The system further comprises a pointing device positioning member having a support surface, a first end, and a second end. The first end of the pointing device positioning member is slidably disposed upon the wrist rest while the second end is slidably engaged with the rear portion of the keyboard support tray. In operation, the pointing device positioning member may be selectively moved about the wrist rest and the rear portion of the keyboard support tray to thereby position the computer mouse relative to the keyboard.

13 Claims, 6 Drawing Sheets

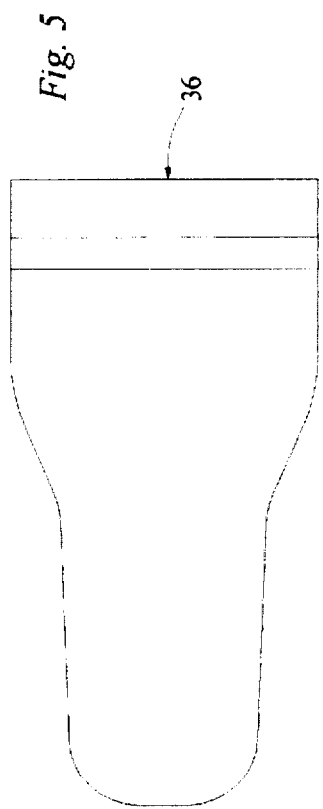
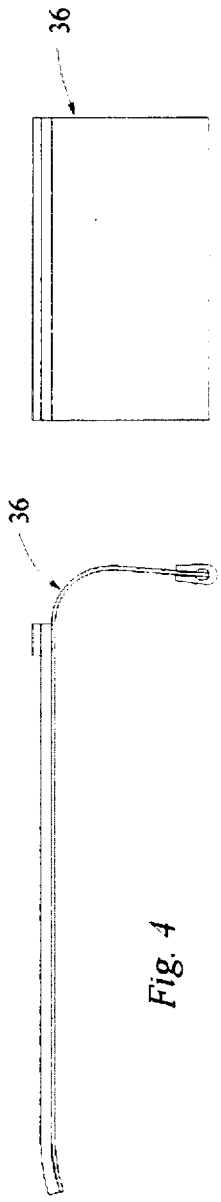
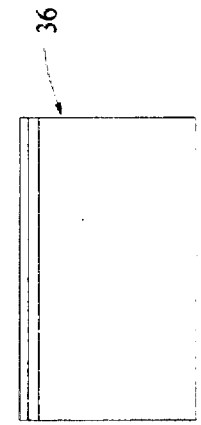
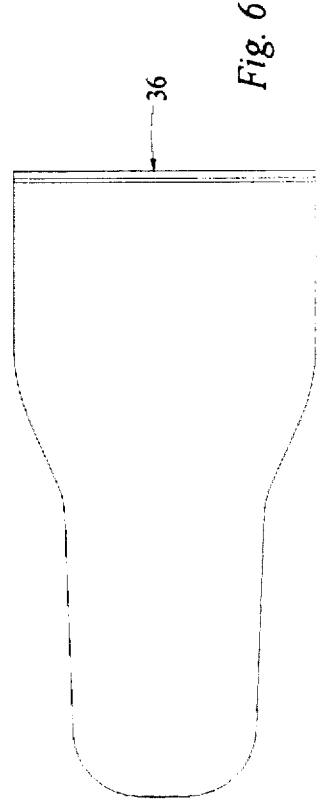
Fig. 5
Fig. 3
Fig. 4
Fig. 6

SLIDING POINTING DEVICE TRAY

FIELD OF THE INVENTION

The present invention relates generally to ergonomic computer equipment. More specifically, the present invention relates to a device for supporting and selectively positioning an electronic pointing device such as a computer mouse relative to a computer keyboard.

BACKGROUND OF THE INVENTION

The use of electronic pointing devices such as computer mouses in connection with computer keyboards and terminals is well known. A few devices have been developed which allow the mouse to be positioned relative to the keyboard. For example, U.S. Pat. No. 5,413,294 discloses a platform 402 that supports a mouse and which is mounted by velcro strips directly to the computer keyboard.

Devices of the type exemplified by U.S. Pat. No. 5,413,294 have several drawbacks. First, such devices do not allow the mouse to readily moved above the keyboard. Second, such devices are configured to attach directly to the keyboard and as such some deformation and/or modification of the keyboard is required. Third, such devices are not uniquely designed for use with a mouse. As such, some operators of the device will ultimately incur discomfort over extended periods of use.

SUMMARY OF THE PRESENT INVENTION

One object of the present invention is to provide a device for supporting and positioning an electronic pointing device such as a mouse relative to and/or above a keyboard and/or work surface wherein the mouse can be easily moved above and about the keyboard.

Another object of the present invention is to provide a device for supporting and positioning an electronic pointing device such as a mouse relative to and/or above a keyboard and/or work surface which does not require any modifications to the keyboard.

Still another object of the present invention is to provide a device for supporting and selectively positioning an electronic pointing device such as a mouse relative to a computer keyboard which is designed for comfort over long and extended periods of use and the ability to be slid about the work surface for custom positioning independent of the keyboard.

The present invention is a device for supporting and selectively positioning an electronic pointing device such as a computer mouse relative to and/or above a computer keyboard which may be mounted on a variety of work surfaces such as a keyboard support tray or a desk.

In one embodiment, the device comprises a keyboard support tray having a rear portion and a support surface adapted to support a keyboard. The system further comprises a palm rest connected to the keyboard support tray. The system further comprises a pointing device positioning member having a first end, a second end, and a support surface adapted to support a pointing device such as a computer mouse. The first end of the pointing device positioning member is slidably engaged with the palm rest while the second end is slidably engaged with the rear portion of the keyboard support tray. In operation, the pointing device positioning member may be selectively moved or slid about and along the palm rest and the rear portion of the keyboard support tray to thereby selectively position the pointing device (such as a computer mouse) above and/or relative to the keyboard.

BRIEF DESCRIPTION OF THE DRAWINGS

The following detailed description of the present invention will be more fully understood with reference to the accompanying drawings in which:

FIG. 3 is a front view of the ornamental design of the pointing device positioning member of the present invention;

FIG. 4 is a side view of the ornamental design of the pointing device positioning member of the present invention;

FIG. 5 is a top view of the ornamental design of the pointing device positioning member of the present invention;

FIG. 6 is a bottom view of the ornamental design of the pointing device positioning member of the present invention;

DETAILED DESCRIPTION OF THE PREFERRED EMBODIMENTS

Figure 1:
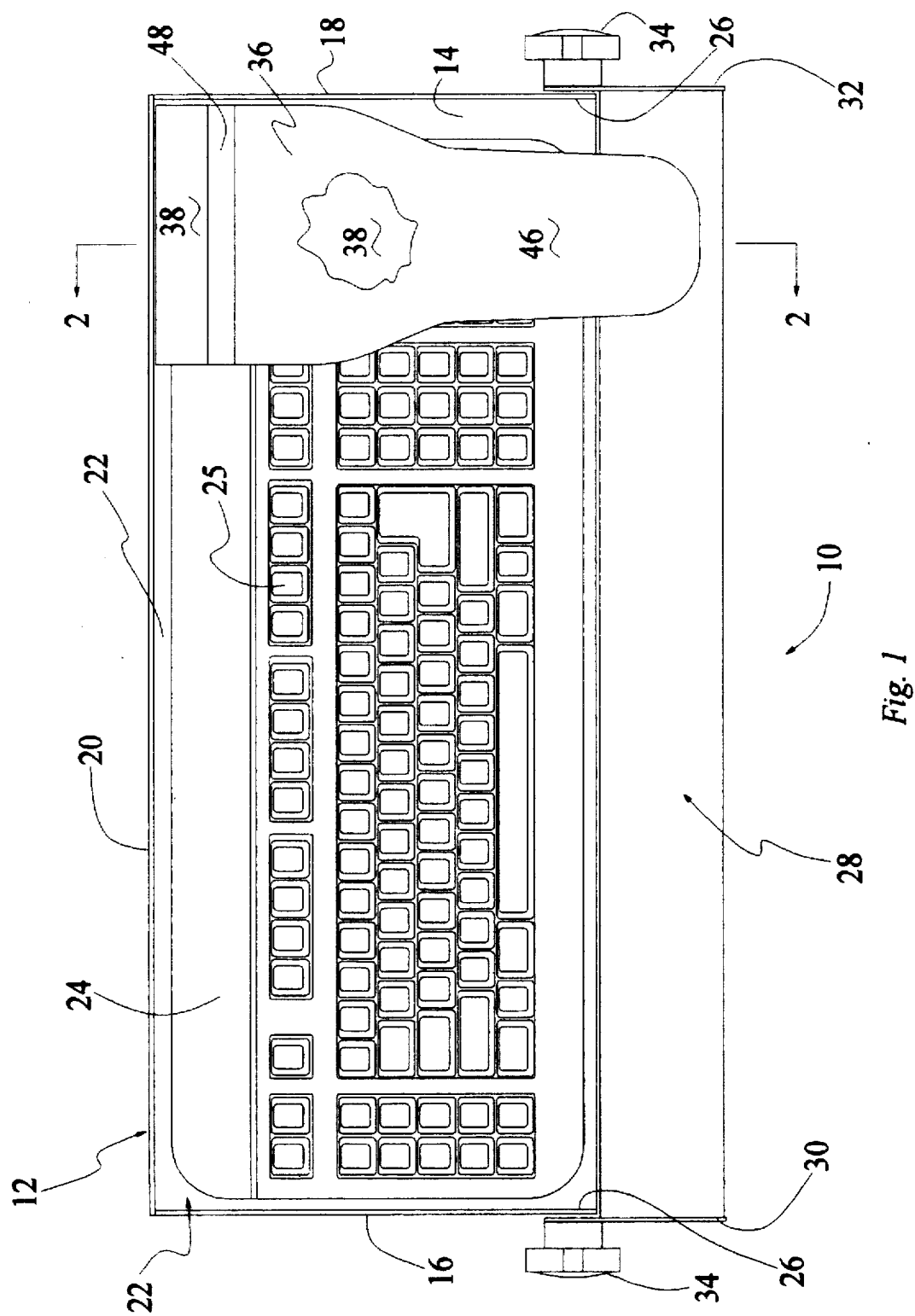
FIG. 1 is a top plan view of one embodiment of the present invention showing a pointing device positioning member slidably disposed about a wrist rest and a keyboard support tray.
Figure 2:
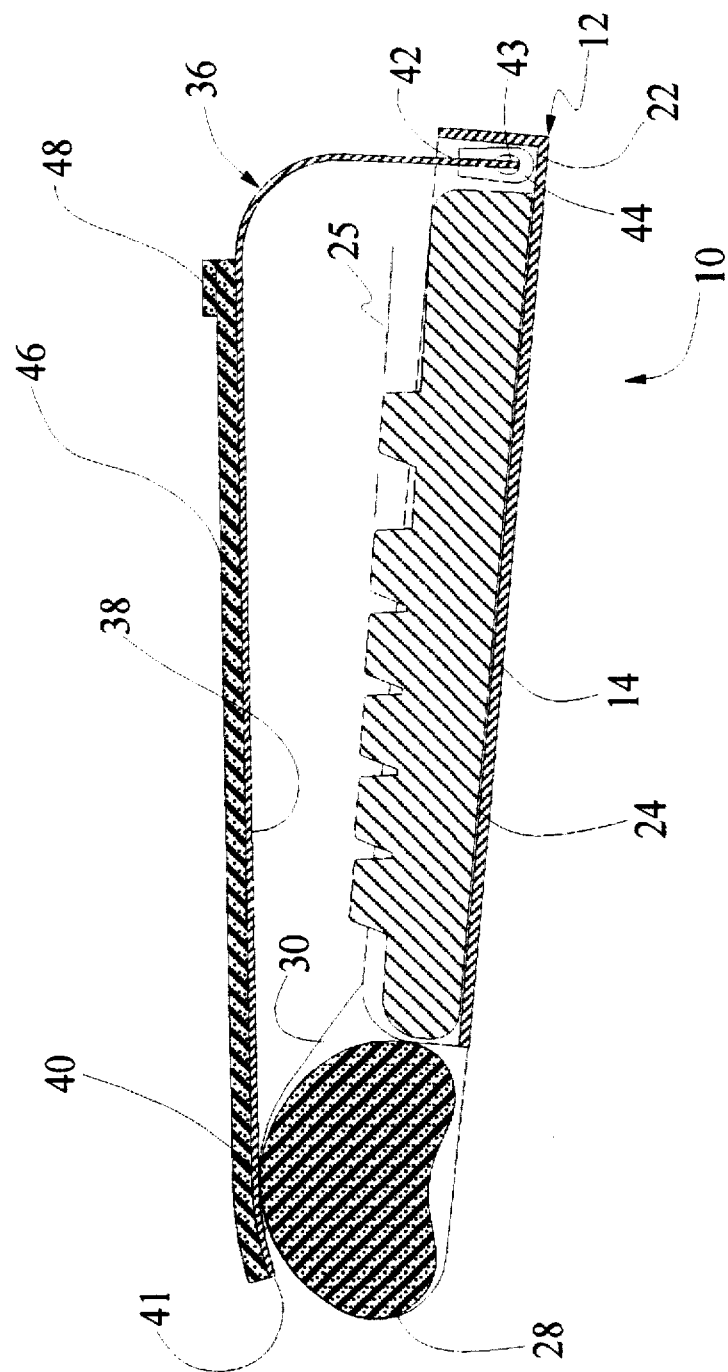
FIG. 2 is a cross section view taken along line 2—2 of FIG. 1 and showing a pointing device positioning member slidably disposed about a wrist rest and a keyboard support tray.
Figure 7:
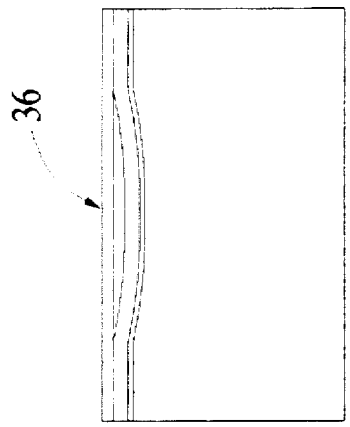
FIG. 7 is a rear view of the ornamental design of the pointing device positioning member of the present invention.
Figure 8:
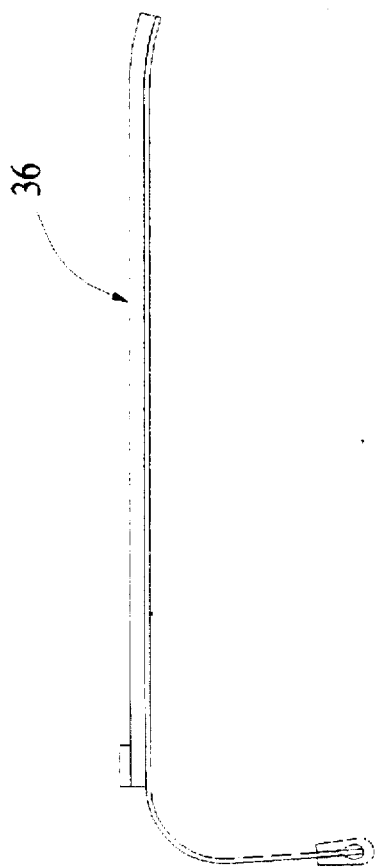
FIG. 8 is a side view of the ornamental design of the pointing device positioning member of the present invention.

Referring to FIGS. 1–3, wherein the system 10 is shown comprising a keyboard support tray 12 having a support surface 14, side walls 16 and 18, a rear wall 20. The support surface 14 has a rearward portion 22 and is adapted to support a keyboard 24 having a facial surface 25. The sidewalls 16 and 18 have a front portion 26.

The system 10 further comprises palm or wrist rest 28 having ends 30 and 32 which are connected to the keyboard support tray 12 at the front portion 26 by conventional means such as a knob 34.

The system 10 further comprises a pointing device positioning member 36 having a support surface 38, a first end 40 terminating in a leading edge 41 and a second end 42 terminating in a leading edge 43. The pointing device positioning member 36 further comprises a bearing or grommet member 44 mounted upon the second end 42 and edge 43. The bearing or grommet member 44 is preferably made from a plastic guide strip and is generally provided to enhance the ability of the second end 42 to slide along the rearward portion 22 and to prevent deformation and/or scratching of the rearward portion 22. The pointing device positioning member 36 may further comprise a first cushion member 46 mounted to the support surface 38 which is adapted to engage with a computer mouse (not shown) or other computer pointing device. The pointing device positioning member 36 further comprises a second cushion member 48 mounted at a rearward end of the first cushion member 46. The second cushion member 48 is adapted to act as a barrier to prevent a computer mouse (not shown) or other computer pointing device from sliding off the pointing device positioning member 36 during use and/or storage. The first and second cushion members 46 and 48 are made from pliable materials such as neoprene. In the embodiment of FIGS. 1 and 2 and the construction and operative position of the palm rest 28 and the keyboard support tray 12 allow the first end 40 to be substantially parallel to that of the support surface 38 while the second end 42 may be positioned substantially perpendicular to that of the support surface 38. As will be readily apparent, the pointing device positioning member 36 may be designed and constructed in a variety of ways depending upon the design of the palm rest 28 and the keyboard support tray 12 or whether the keyboard 24 is simply mounted upon a desk surface. In operation, the pointing device positioning member 36 may be selectively moved or slided about and along the palm rest 28 and the rear portion of the keyboard support tray 22 to thereby selectively position the pointing device (such as a computer mouse) above and/or relative to the keyboard 24.

FIGS. 3-8 show one embodiment of the ornamental design of the pointing device positioning member 36 as depicted in FIGS. 1 and 2.

Figure 9:
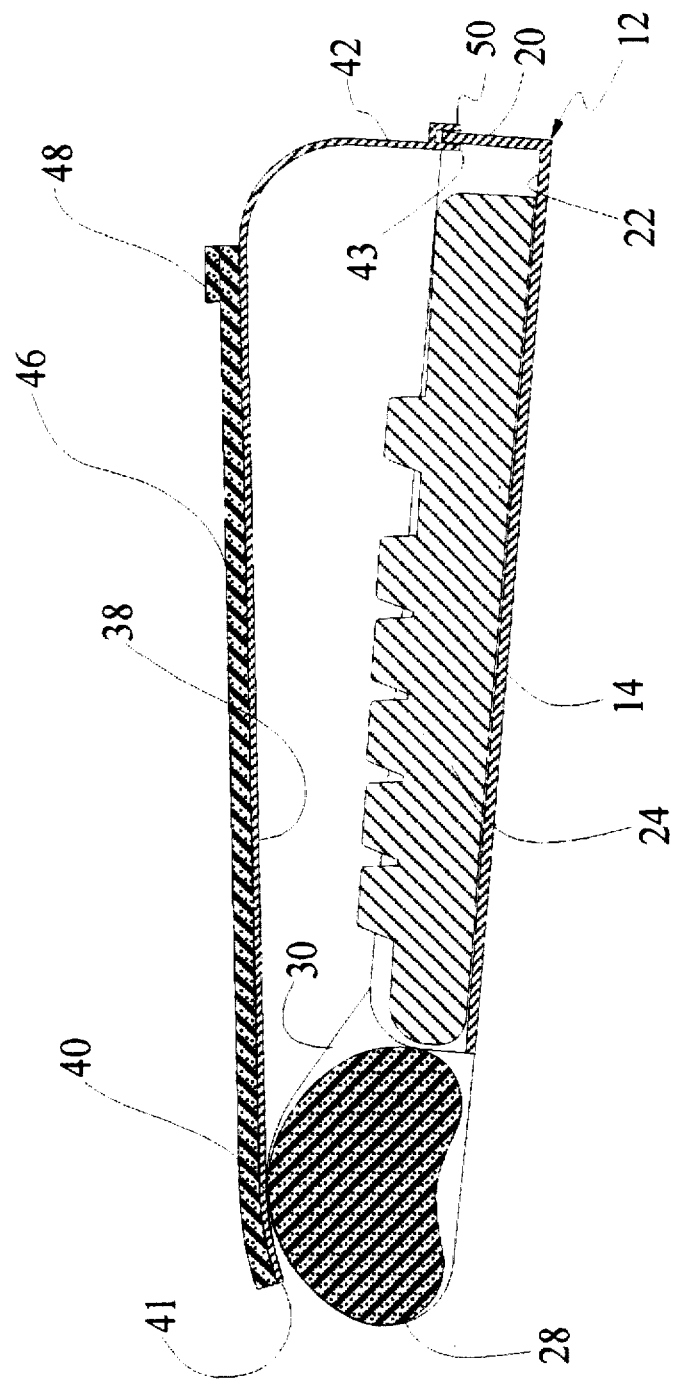
FIG. 9 is a cross-section view showing another embodiment of the present invention.

FIG. 9 shows a second embodiment of the system 10 and of the pointing device positioning member 36. In this embodiment, the bearing member 44 has been removed and a channeled or flange member 50 is formed with the second end 42 to form a channel which is adapted to slidably engage with the rear wall 20 of the keyboard support tray 12.

Figure 10:
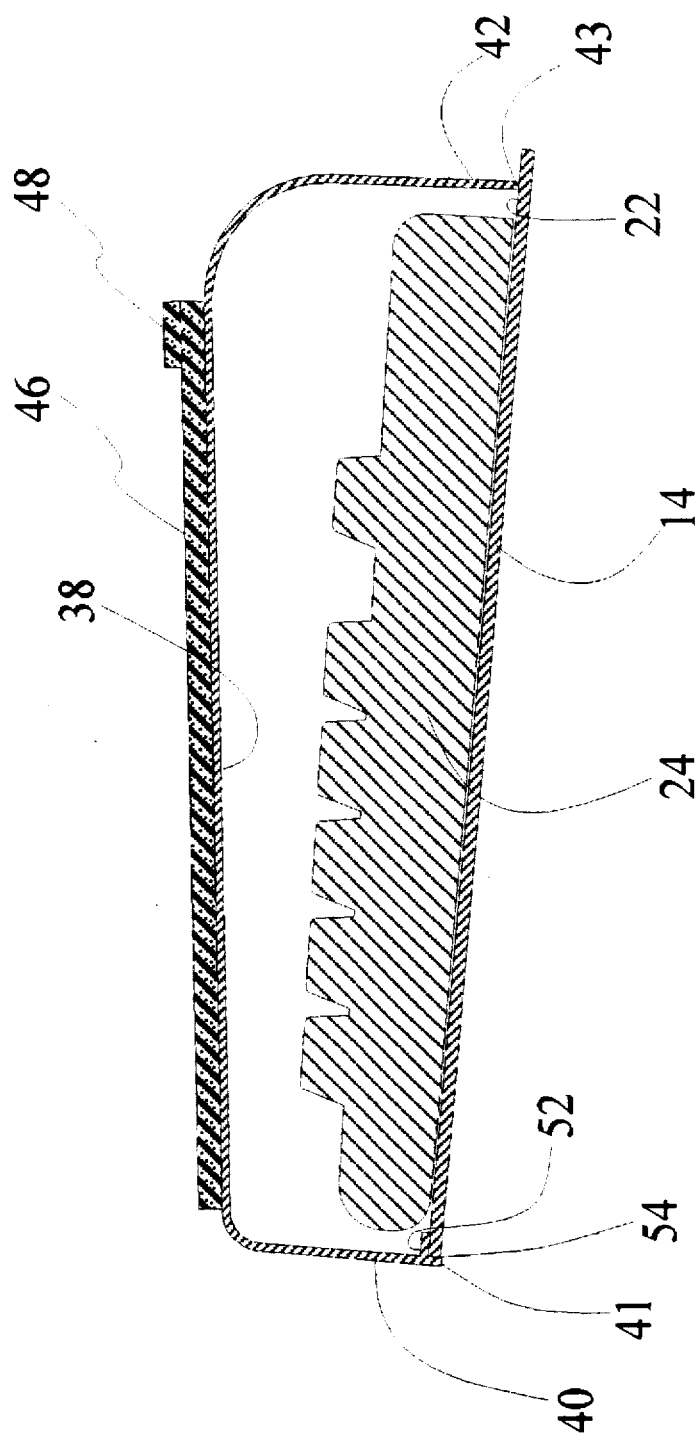
FIG. 10 is a cross-section view showing another embodiment of the present invention.

FIG. 10 shows a second embodiment of the system 10 and of the pointing device positioning member 36. In this embodiment, the second end 42 and leading edge 43 is adapted to slidably engage directly with the rearward portion 22 of the support surface 14. In this embodiment, the first end 40 is formed with a flanged portion 52 which along with the edge 41 is adapted to slidably engage with a leading edge 54 of the support surface 14 of the keyboard support tray 12.

Although not shown, the pointing device positioning member 36 has been described with reference to a computer keyboard 24 mounted on a support surface 14 of a keyboard support tray 12, it should be understood that the support surface 14 may constitute any type of work surface such as desk. In this embodiment, the pointing device positioning member 36 may, for example, be used with a keyboard 24 which is mounted directly on a desk surface and could be designed such that the first end 40 and the second end 42 are in slidable engagement with the desk surface.

The pointing device positioning member 36 of the present invention may take a variety of designs and be constructed in a variety of ways. By way of example only consider the following:

(1) the pointing device positioning member 36 could be designed such that the first end 40 is not parallel to the support surface 38. This non-parallel feature might be necessary if for example the palm rest 28 were positioned below and/or adjacent the keyboard 24 rather than above the keyboard 24 as shown in FIGS. 1-2 and 9. Further, such a non-parallel feature might be necessary if the palm rest 28 were positioned at an extreme position above the keyboard 24;

(2) the first end 40 of the pointing device positioning member 36 might also be designed to slidably engage with a portion of the keyboard support tray 12 itself rather than the palm rest 28 which could be removed in its entirety. By way of example, the first end 40 of the pointing device positioning member 36 might be curved downward and slidably engage with a portion of the support surface 14 which is adjacent to and in front of the keyboard 24;

(3) the second end 42 does not necessarily have to be substantially perpendicular to that of the support surface 38. By way of example only, if the rearward portion 22 of the keyboard support surface 14 were of larger dimensions, than the second end 42 could be at an angle less than perpendicular to that of the support surface 38;

(4) although the first end 40, the support surface 38 and the second end 42 have been shown of integral construction, the first end 40, support surface 38 and the second end 42 might be constructed of non-integral parts;

(5) the pointing device positioning member 36 may be made from a variety of materials such as steel or plastic and formed by a variety of processes such as conventional bending or injection molding processes;

(6) the bearing or grommet member 44 is mounted to the second end 42 and is in direct slidable contact with the rearward portion 22. Alternatively, the bearing member 44 could be discarded and the second end 42 could be in direct slidable contact with the rearward portion 22; and (7) the second end 42 and edge 43 may be constructed to have one or more rollers or wheels disposed therein to thereby further enhance the ability of the pointing device positioning member 36 to slide upon the keyboard support tray 12.

Similarly, the keyboard support tray 12 and the palm rest 28 may take a variety of designs and be constructed in a variety of ways. By way of example, consider the following:

(1) the palm rest 28 may be fixed or movably connected or formed integral to the keyboard support tray;

(2) the palm rest 28 may be positioned below, adjacent to and/or above a keyboard mounted on the keyboard support tray;

(3) the keyboard support tray 12 may be part fixed or moveable in either a positive or negative tilt orientation;

(4) the keyboard support tray 12 may be part of a mechanism which positions the keyboard below a work surface such as a desk;

(5) the keyboard support tray 12 may be part of a mechanism which allows the keyboard support tray 12 to be stored within a housing;

(6) the keyboard support tray 12 may be part of a mechanism which positions the keyboard above and/or on a work surface such as a desk;

(7) the keyboard support tray 12 itself might be mounted directly on a surface such as a desk;

(8) although the keyboard support tray 12 has been shown as an integral unit, the keyboard support tray 12 might be comprises of separate parts;

(9) although in the embodiment shown, the keyboard support tray 12 simply supports a keyboard 24, the keyboard support tray 12 might be designed to be adjustable to accommodate a variety of differently sixed keyboards; and

(10) the keyboard support tray 12 has been shown with a generally rectangular shape and sized slightly larger than the keyboard 24 while allowing sufficient space for an unobstructed rearward portion 22 so that the second end 42 of the pointing device positioning member 36 can be readily slidable thereon. Alternatively, the keyboard support tray 12 could have significantly larger dimensions than the keyboard 24 to allow the pointing device positioning member 36 to be designed differently and/or have a greater range of movement. By way of example only, the keyboard support tray 12 might be designed with a very wide dimension as compared with the width of the keyboard 24 thereby allowing the pointing device positioning member 36 to be slidably moved to a position on either side of the keyboard 24.

The foregoing description is intended primarily for purposes of illustration. The invention may be embodied in other forms or carried out in other ways without departing from the spirit or scope of the invention. Modifications and variations still falling within the spirit or the scope of the invention will be readily apparent to those skilled in the art.

What is claimed is:

1. A system for positioning a pointing device relative to a computer keyboard comprising:
   (a) a keyboard support tray having a support surface, a front portion, and a rear portion, said support surface being adapted to support the keyboard;
   (b) a palm rest connected to said front portion of said keyboard support tray;
   (c) a pointing device positioning member having a support surface, a first end and a second end, said first end being slidably disposed upon said palm rest and said second end being slidably engaged with said rear portion of said keyboard support tray,
   whereby said pointing device positioning member may be moved about said palm rest and said rear portion of said keyboard support tray to thereby position the pointing device to a variety of positions above the keyboard.

2. The system of claim 1, wherein said pointing device positioning member further comprises a cushioned member mounted to said support surface and adapted to engage the pointing device.

3. The system of claim 2, wherein said support surface, said first end, and said second end of said pointing device positioning member are integrally formed.

4. The system of claim 3, wherein said support surface of said pointing device positioning member is positioned in a substantially parallel direction to said first end of said pointing device positioning member.

5. The system of claim 4, wherein said support surface of said pointing device positioning member is positioned at an angle of about ninety degrees to said second end of said pointing device positioning member.

6. The system of claim 5, wherein said pointing device positioning member further comprises a bearing member disposed upon said second end of said pointing device positioning member and which is slidably engaged with said rear portion of said keyboard support tray.

7. The system of claim 6, wherein said support surface of said pointing device positioning member is made from steel.

8. The system of claim 7, wherein said cushioned member of said pointing device positioning member is made from a pliable material.

9. The system of claim 8, wherein said bearing member of said pointing device positioning member is made from plastic.

10. The system of claim 1, wherein said rear portion of said keyboard support tray comprises a wall and said second end of said pointing device positioning member forms a channel for receiving said wall.

11. A system for positioning a pointing device relative to a keyboard comprising:
    (a) a keyboard support tray having a support surface, a front portion, and a rear portion, said support surface being adapted to support the keyboard; and
    (b) a pointing device positioning member having a support surface, a first end, and a second end, said first end being slidably disposed upon said front portion of said keyboard support tray and said second end being slidably disposed upon said rear portion of said keyboard support tray, whereby said pointing device positioning member may be moved about said keyboard support tray to thereby position the pointing device to a variety of positions above the keyboard.

12. The system of claim 11 wherein said front portion of said keyboard support tray comprises a leading edge and said first end of said pointing device positioning member includes a flange portion for engagement therewith.

13. A system for positioning a pointing device relative to a keyboard comprising:
    (a) a keyboard support tray comprising a support surface adapted to support the keyboard; and
    (b) a pointing device positioning member having a first end, a second end, and a support surface adapted to support the pointing device;
    wherein at least one of said first end and said second end is slidably disposed relative to the support tray such that the pointing device positioning member support surface may be moved to a variety of positions above the keyboard support tray support surface; and
    wherein the keyboard support tray further comprises a palm rest and the first end of the pointing device positioning member may be moved to a variety of positions over the palm rest.

* * * * *